United States Patent
Chen

(10) Patent No.: US 10,913,189 B2
(45) Date of Patent: Feb. 9, 2021

(54) MECHANISM FOR MIXING SUPERCRITICAL FLUID AND POLYMER RAW MATERIAL MELT

(71) Applicant: OTRAJET INC., Taichung (TW)

(72) Inventor: Fa-Shen Chen, Taichung (TW)

(73) Assignee: OTRAJET INC., Taichung (TW)

(*) Notice: Subject to any disclaimer, the term of this patent is extended or adjusted under 35 U.S.C. 154(b) by 275 days.

(21) Appl. No.: 15/647,087

(22) Filed: Jul. 11, 2017

(65) Prior Publication Data

US 2018/0345546 A1 Dec. 6, 2018

(30) Foreign Application Priority Data

Jun. 5, 2017 (TW) .............................. 106118578 A

(51) Int. Cl.
*B29C 44/42* (2006.01)
*B29C 45/18* (2006.01)
(Continued)

(52) U.S. Cl.
CPC ............ *B29C 44/42* (2013.01); *B29B 7/7414* (2013.01); *B29B 7/7433* (2013.01); *B29B 7/94* (2013.01);
(Continued)

(58) Field of Classification Search
CPC . B29C 44/42; B29C 44/3423; B29C 44/3442; B29C 44/3446; B29C 44/348;
(Continued)

(56) References Cited

U.S. PATENT DOCUMENTS 4,779,989 A 10/1988 Barr
6,884,823 B1 * 4/2005 Pierick .................... B29C 44/00
521/79
(Continued)

FOREIGN PATENT DOCUMENTS

CN 103057061 B * 10/2015
CN 103057061 B 10/2015
(Continued)

OTHER PUBLICATIONS

JP 2005-329582A Machine Translation Japanese to English. A 2019 translation of a 2005 document. (Year: 2019).*
(Continued)

*Primary Examiner* — Joseph S Del Sole
*Assistant Examiner* — Lawrence D. Hohenbrink, Jr.
(74) *Attorney, Agent, or Firm* — Guice Patents PLLC

(57) ABSTRACT

A mechanism for mixing a supercritical fluid and a polymer raw material melt provided by the present invention includes a hot-melting unit, a mixing unit, and a supercritical fluid supplying unit. The mixing unit, independently of the hot-melting unit, receives a polymer melt from the hot-melting unit and a supercritical fluid from the supercritical fluid supplying unit, respectively, and mixes the polymer melt and the supercritical fluid into a homogenous single-phase solution. The hot-melting unit is provided with a pushing member for pushing a polymer raw material. The mixing unit is provided with a mixing rotor for mixing the polymer melt and the supercritical fluid.

6 Claims, 6 Drawing Sheets

(51) Int. Cl.
*B29C 44/34* (2006.01)
*B29C 48/92* (2019.01)
*B29B 7/74* (2006.01)
*B29B 7/94* (2006.01)
*B29C 45/58* (2006.01)
*B29C 45/54* (2006.01)
*B29C 45/02* (2006.01)
*B29C 45/17* (2006.01)

(52) U.S. Cl.
CPC ........ *B29C 44/348* (2013.01); *B29C 44/3423* (2013.01); *B29C 44/3442* (2013.01); *B29C 44/3446* (2013.01); *B29C 45/1808* (2013.01); *B29C 45/1816* (2013.01); *B29C 45/54* (2013.01); *B29C 45/581* (2013.01); *B29C 48/92* (2019.02); *B29C 45/02* (2013.01); *B29C 2045/1722* (2013.01); *B29C 2948/926* (2019.02); *B29C 2948/92704* (2019.02); *C08J 2203/08* (2013.01)

(58) Field of Classification Search
CPC .......... B29C 48/92; B29C 2948/92704; B29C 2948/926; B29C 45/1808; B29C 45/1816; B29C 45/54; B29C 45/581; B29C 45/02; B29C 2045/1722; B29B 7/7414; B29B 7/7433; B29B 7/94; C08J 2203/08

USPC ........................................................ 425/149
See application file for complete search history.

(56) References Cited

U.S. PATENT DOCUMENTS

2004/0009250 A1* 1/2004 Schuermann ....... B29C 44/0492
 425/4 R
2007/0183254 A1 8/2007 Schobert-Csongor

FOREIGN PATENT DOCUMENTS

| EP | 0376671 | A2 | | 4/1990 | |
|---|---|---|---|---|---|
| EP | 0463759 | A2 | | 1/1992 | |
| EP | 2033758 | A1 | | 11/2009 | |
| JP | 2000084968 | A | | 3/2000 | |
| JP | 2001096603 | A | | 4/2001 | |
| JP | 2005329582 | A | * | 12/2005 | |
| JP | 2005329582 | A | | 12/2005 | |
| JP | 2007276321 | A | * | 10/2007 | ........... B29C 48/385 |
| JP | 2007276321 | A | | 10/2007 | |

OTHER PUBLICATIONS

JP 2007-276321A Machine Translation Japanese to English. A 2019 translation of a 2007 document. (Year: 2019).*
CN-103057061-B Machine translation CN to Eng (Year: 2015).*

* cited by examiner

MECHANISM FOR MIXING SUPERCRITICAL FLUID AND POLYMER RAW MATERIAL MELT

BACKGROUND OF THE INVENTION

1. Field of the Invention

The present invention relates to polymer processing technology, and more particularly to a mechanism for mixing a supercritical fluid and a polymer raw material melt.

2. Description of the Related Art

A substance is in a supercritical fluid state when it is in an environment having a temperature and pressure above its critical temperature and pressure. It is between a gas phase and a liquid phase in nature, has surface tension, viscosity and diffusivity similar to a gas, and also has density and solvation ability close to a liquid. Therefore, by using a high-temperature and high-pressure environment provided by a pressing cartridge for melting a solid polymer raw material in the prior art, a supercritical fluid may be mixed into a polymer melt, and by using a pressure drop between the pressing cartridge and the chamber space of a mold, after the supercritical fluid enters the chamber space, a plurality of nucleating points is formed in the polymer melt and grows into air bubbles, such that the polymer melt is molded into a foamed polymer article.

Further, it is also disclosed in the prior art that a polymer raw material placed in advance in the inner chamber space of a mold is impregnated with a supercritical fluid subsequently entering the chamber space, and then by changing the pressure and temperature in the chamber space, air bubbles are generated by using the phase change of the supercritical fluid, such that the polymer raw material is molded into a foamed polymer article.

Inert gases such as carbon dioxide or nitrogen gas are supercritical fluids commonly used as foaming agents, where carbon dioxide has a critical pressure of 7.185 MPa and a critical temperature of 304.265 K. In the prior art, to maintain carbon dioxide in the supercritical fluid state, the temperature and pressure in the pressing cartridge or chamber space are required to be greater than the critical temperature and critical pressure values to avoid segregation. However, in industrial utilization, for example, in the injection molding process, normally, the injection pressure of 700 to 1500 $kg/cm^2$ can satisfy the pressure condition required for the injection molding process. The critical pressure of carbon dioxide of up to 7 Mpa is obviously much higher. Therefore, to maintain the supercritical fluid state of carbon dioxide in the pressing cartridge, the injection pressure in the pressing cartridge needs to be additionally raised, resulting in increased energy consumption.

Although the operating conditions for polymer processing vary depending on the type of raw materials and there exists an operating condition in which no additional pressure increase is required, since the supercritical fluid is required to be mixed with the polymer melt into a single-phase solution, in the technical scope using the pressing cartridge for hot-melting, the part where the supercritical fluid is introduced is appropriately a metering section of a screw, which is located at the rear section of the pressing cartridge and in which the polymer raw material is already molten. In this way, the mixing time of the supercritical fluid and the polymer melt is restricted by the rotation speed of the screw in the pressing cartridge, so that the disadvantage of non-uniform mixing may be caused, and after a pressure drop, the nucleation of the air bubbles in the polymer is not uniform, affecting the forming quality of a foamed polymer article.

SUMMARY OF THE INVENTION

Therefore, the main objective of the present invention is to provide a mechanism for mixing a supercritical fluid and a polymer raw material melt, which performs mixing of the supercritical fluid and the polymer raw material melt into a single-phase solution, independently of a structure for heating a solid polymer raw material into a melt, thereby avoiding interference there-between.

Accordingly, to achieve the above objective, the mechanism for mixing a supercritical fluid and a polymer raw material melt provided by the present invention includes a hot-melting unit, a mixing unit, and a supercritical fluid supplying unit. The mixing unit, independently of the hot-melting unit, receives a polymer melt from the hot-melting unit and a supercritical fluid from the supercritical fluid supplying unit, respectively, and mixes the polymer melt and the supercritical fluid into a homogenous single-phase solution. The hot-melting unit is provided with a pushing member for pushing a polymer raw material. The mixing unit is provided with a mixing rotor for mixing the polymer melt and the supercritical fluid.

To heat a solid polymer raw material into a melt by hot-melting, the hot-melting unit has a hollow pressing cartridge. A first feeding passage and a first discharging passage are disposed at two ends of the pressing cartridge, respectively, and communicate with a hollow interior of the pressing cartridge and the external space of the pressing cartridge, respectively. The pushing member is disposed in the pressing cartridge between the first feeding passage and the first discharging passage, and is used to push, toward the first discharging passage, a polymer raw material entering the hollow interior of the pressing cartridge through the first feeding passage. The solid polymer raw material is heated into a flowable melt by hot-melting during the pushing process.

To perform mixing of the polymer melt and the supercritical fluid, the mixing unit has a hollow mixing cartridge. A second feeding passage and a second discharging passage are disposed at two ends of the mixing cartridge, respectively. The second feeding passage communicates with the first discharging passage, such that the polymer raw material pushed out of the first discharging passage enters a hollow interior of the mixing cartridge through the second feeding passage. The mixing rotor is disposed in the mixing cartridge between the second feeding passage and the second discharging passage, and is rotatable in the mixing cartridge, so as to mix the polymer raw material and the supercritical fluid accommodated in the mixing cartridge by agitation.

To supply the supercritical fluid required in the mixing, the supercritical fluid supplying unit is disposed on the mixing unit and spaced from the hot-melting unit, such that the external supercritical fluid is introduced into the hollow interior of the mixing cartridge, and together with the polymer melt in the mixing cartridge, is agitated by the mixing rotor and mixed into a homogenous solution.

The supercritical fluid supplying unit has a gas transfer passage, disposed on the mixing cartridge and communicating with the hollow interior of the mixing cartridge, and used to form a flow passage through which the external supercritical fluid enters the mixing cartridge. The gas transfer passage may be disposed adjacent to the second feeding passage, such that the supercritical fluid and the polymer melt is mixed as soon as possible.

To perform mixing of the polymer melt and the supercritical fluid immediately after they enter the mixing unit respectively, the mixing rotor has a column-like body in structure, rotatably disposed in the mixing cartridge. A first groove portion is annularly arranged on the periphery of the column-like body at one end adjacent to the second feeding passage, and is adjacent to the second feeding passage and the gas transfer passage. Accordingly, when the column-like body rotates, the polymer melt and the supercritical fluid entering the mixing cartridge are agitated and mixed by means of the first groove portion.

Further, the mixing rotor includes a second groove portion, annularly arranged on the periphery of the column-like body at the other end adjacent to the second discharging passage, and used to further agitate the polymer melt and the supercritical fluid which have been preliminarily mixed by the first groove portion.

To achieve the desired mixing effect, the first groove portion and the second groove portion are respectively divided into a plurality of arc-shaped grooves of different curvatures.

In addition, the single-phase solution obtained after mixing by the mixing unit may be directly transferred from the mixing unit to an external mold for molding and foam-forming processes, and may also be indirectly measured by a metering unit and then transferred to an external mold for molding and foam-forming.

The metering unit has a hollow metering cartridge, a hollow inner space thereof communicating with the second discharging passage and used to accommodate the single-phase solution; and a discharging member, slidably disposed in the hollow inner space of the metering cartridge, and used to discharge the single-phase solution accommodated in the metering cartridge out of the metering cartridge.

DETAILED DESCRIPTION OF THE PREFERRED EMBODIMENTS

A preferred embodiment of the present invention is described in detail below with reference to the accompanying drawings.

Figure 1:
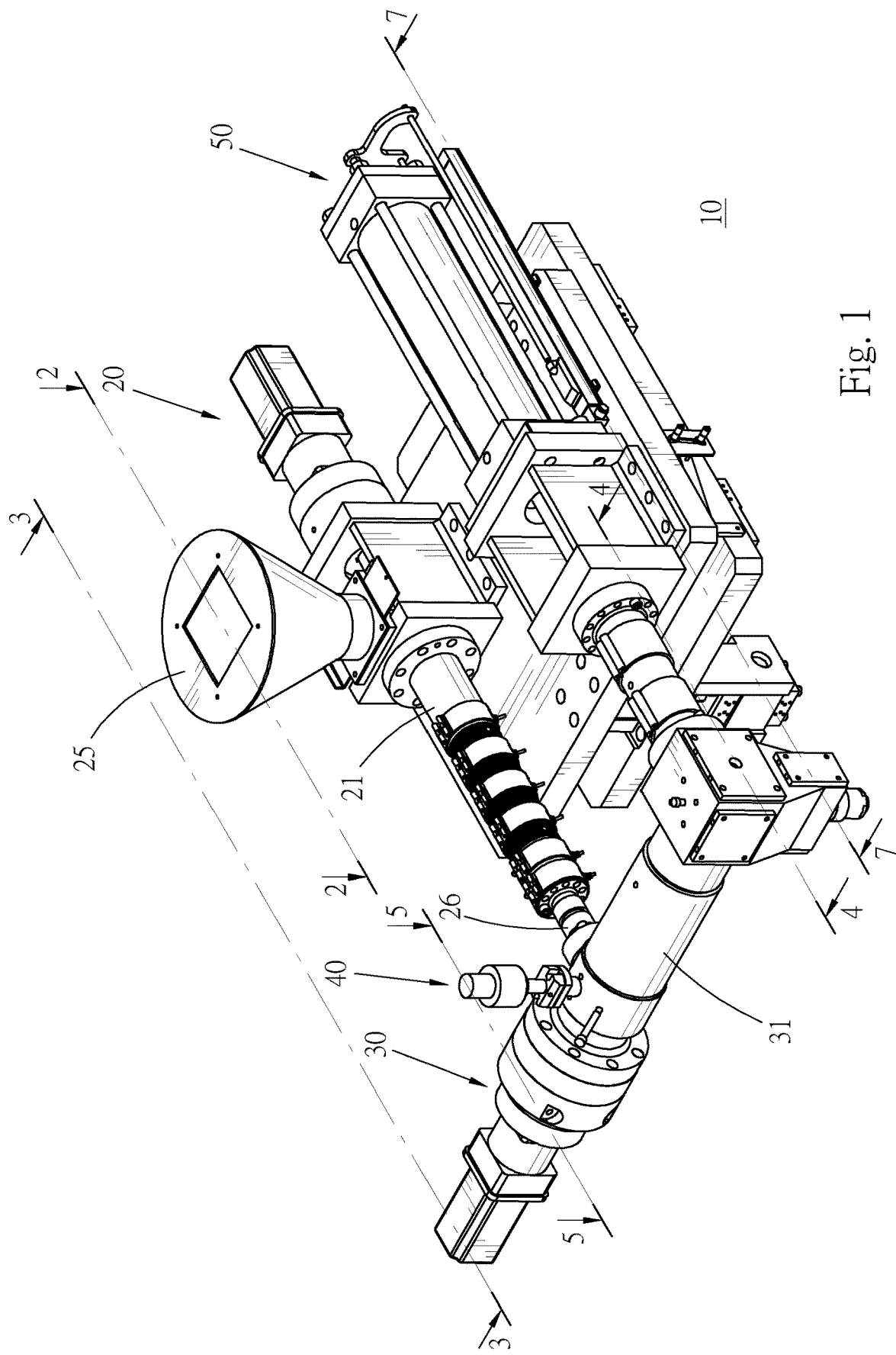
FIG. 1 is a perspective view of one embodiment of the present invention.

Firstly, referring to FIG. 1, a mechanism (10) for mixing a supercritical fluid and a polymer raw material melt provided in a preferred embodiment of the present invention mainly includes a hot-melting unit (20), a mixing unit (30), a supercritical fluid supplying unit (40), and a metering unit (50).

Figure 2:
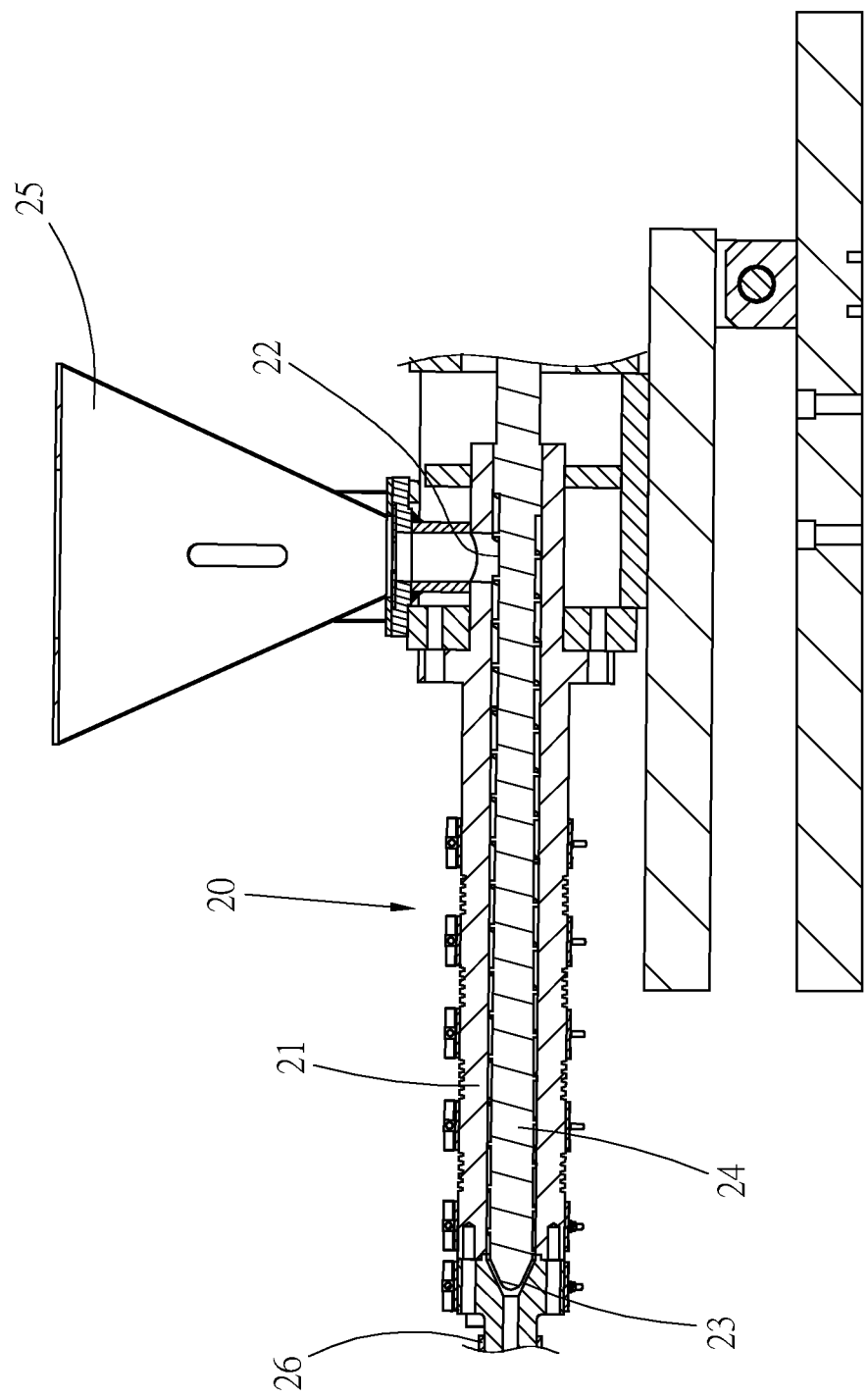
FIG. 2 is a cross-sectional view taken along the section line 2-2 in FIG. 1.
Figure 3:
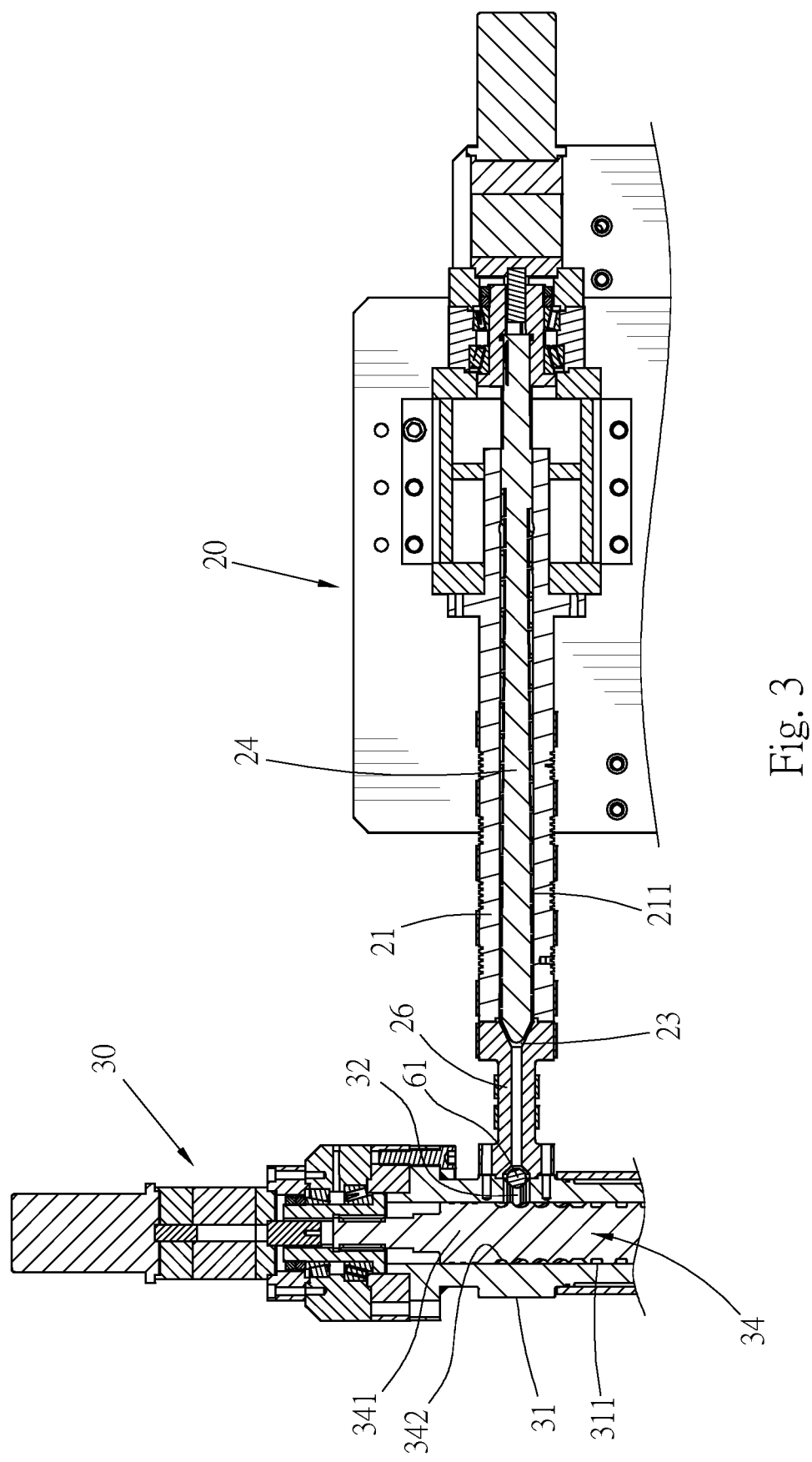
FIG. 3 is a cross-sectional view taken along the section line 3-3 in FIG. 1.

As shown in FIG. 2 and FIG. 3, the hot-melting unit (20) has a hollow pressing cartridge (21) in the shape of a cylinder according to the technical content of a pressing cartridge disclosed in the conventional injection molding or extrusion molding technology. A first feeding passage (22) and a first discharging passage (23) are disposed at two ends of the pressing cartridge (21), respectively, and communicate with a pressing cartridge inner space (211) of the pressing cartridge (21). A screw-shaped pushing member (24) is coaxial with the cylindrical axis of the pressing cartridge (21), and is rotatably disposed in the pressing cartridge inner space (211) of the pressing cartridge (21). A feeding hopper (25) is fixedly disposed on one end of the pressing cartridge (21), and communicates with the pressing cartridge inner space (211) through the first feeding passage (22). A discharging end member (26) is disposed on the other end of the pressing cartridge (21), and communicates with the pressing cartridge inner space (211) through the first discharging passage (23).

Thereby, an external solid polymer raw material can enter the pressing cartridge inner space (211) from the feeding hopper (25) through the first feeding passage (22), and is pushed with rotation of the pushing member (24) to move toward the first discharging passage (23). The polymer raw material is heated into a flowable melt by hot-melting during the movement, and flows out from the first discharging passage (23). The technical content of hot-melting is known in the prior art, and the description thereof is omitted herein.

Figure 4:
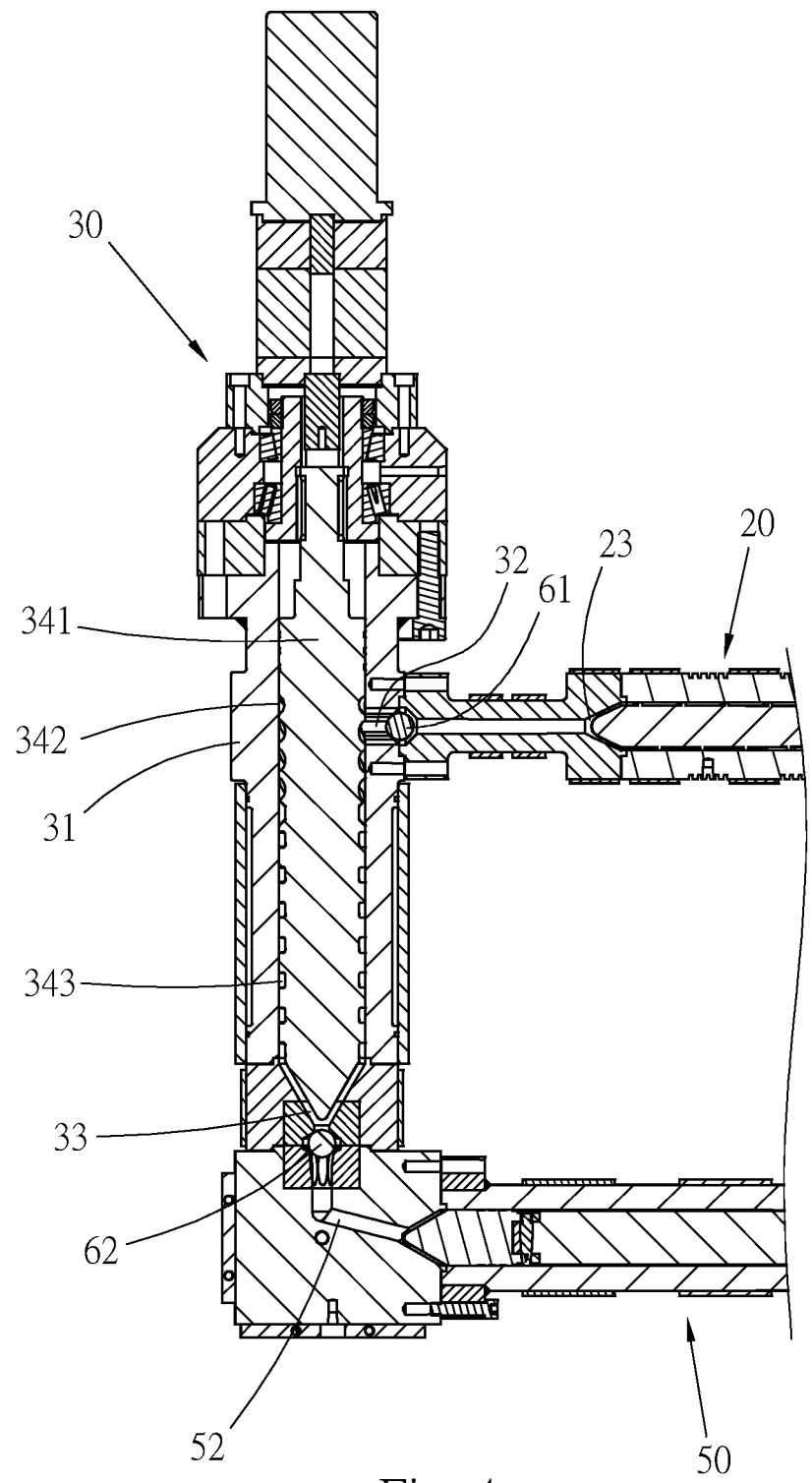
FIG. 4 is a cross-sectional view taken along the section line 4-4 in FIG. 1.
Figure 5:
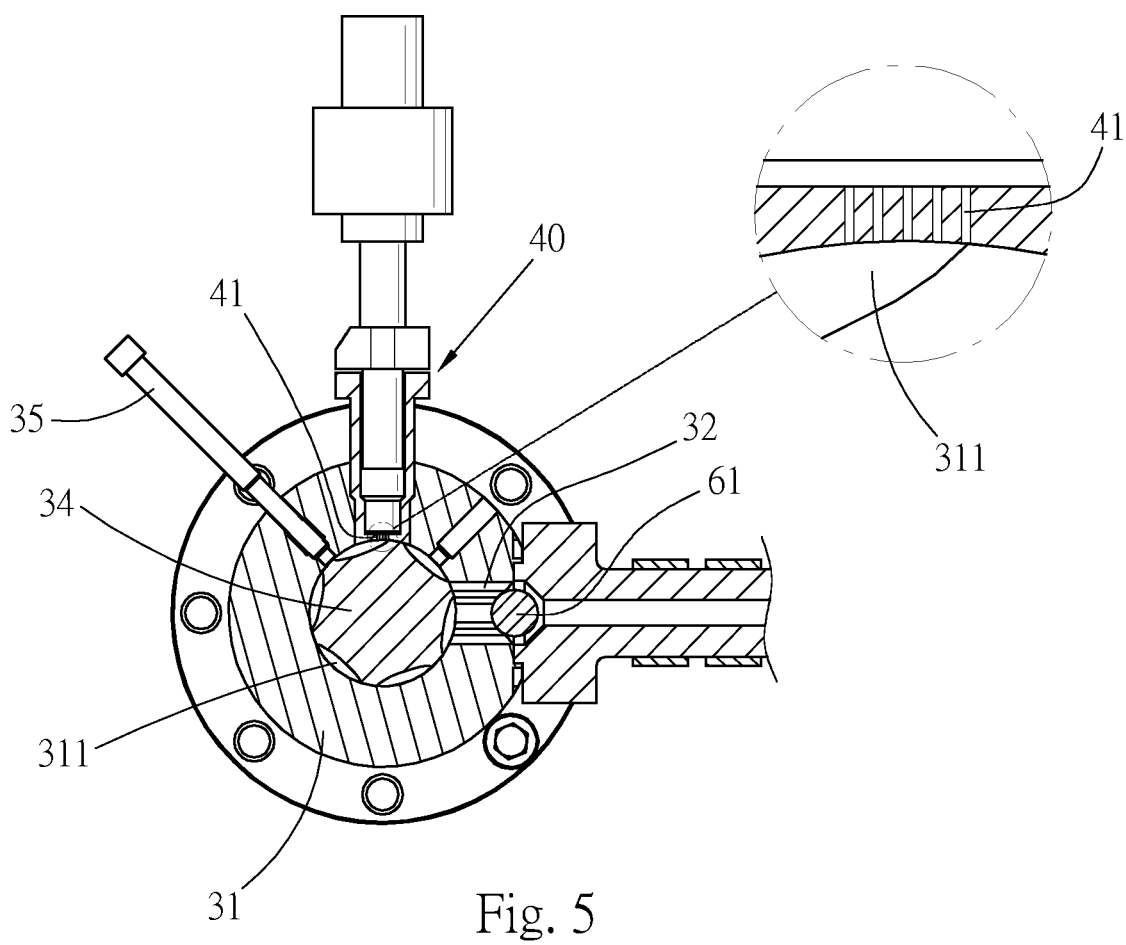
FIG. 5 is a cross-sectional view taken along the section line 5-5 in FIG. 1.

The mixing unit is similar to a conventional injection pressing cartridge, extrusion pressing cartridge, blending device or the like that is capable of achieving melt-mixing in which different fluids are mixed into a homogenous solution. In the present embodiment, as shown in FIG. 3 to FIG. 5, the mixing unit (30) has a hollow mixing cartridge (31) in the shape of a cylinder, located outside the first discharging passage (23), and the side of the mixing cartridge (31) adjacent to one end of the cylindrical axis is fixedly connected to the discharging end member (26), so as to be indirectly and fixedly connected outside the other end of the pressing cartridge (21). A second feeding passage (32) is disposed at the interconnection of the mixing cartridge (31) and the discharging end member (26), and communicates with the first discharging passage (23) through the discharging end member (26). A second discharging passage (33) is disposed at the other end of the cylindrical axis of the mixing cartridge (31), so as to be separated from the second feeding passage (32), and communicates with the second feeding passage (32) through the mixing cartridge inner space (311) of the mixing cartridge (31). A mixing rotor (34) is coaxial with the cylindrical axis of the mixing cartridge (31), rotatably disposed in the mixing cartridge (31), and located between the second feeding passage (32) and the second discharging passage (33). Therefore, after flowing out from the first discharging passage (23), the polymer melt can enter the mixing cartridge inner space (311) through the second feeding passage (32), is agitated with rotation of the mixing rotor (34), and flows out of the mixing unit (30) through the second discharging passage (33).

The supercritical fluid supplying unit (40) has a supplying system (not shown) for turning inert gases such as carbon dioxide or nitrogen gas into supercritical fluids, and flowing passages for supercritical fluids are formed by using pipeline technology such as pipes and valves. However, since the supercritical state-forming technology and transfer technology of the gases are known in the prior art and are not technical features of the present invention, the descriptions thereof are omitted herein. Technologies related to the technical features of the present invention are described herein. As shown in FIG. 5, the supercritical fluid supplying unit (40) has a plurality of hole-shaped gas transfer passages (41), disposed on a part of the mixing cartridge (31) adjacent to the discharging end member (26), and communicating with the mixing cartridge inner space (311), so as to form flow passages through which the supercritical fluid enters the mixing cartridge inner space (311) from the outside.

Through the configuration of the above components, a polymer melt obtained after hot-melting by the hot-melting unit (20) enters the mixing cartridge inner space (311) through the second feeding passage (32) under a pushing force provided by the pushing member (24), while an external supercritical fluid also enters the mixing cartridge inner space (311) through the gas transfer passages (41), such that the polymer melt and the supercritical fluid are agitated and mixed into a homogenous single-phase solution in the mixing cartridge inner space (311) with rotation of the mixing rotor (34), and then flow out for use through the second discharging passage (33).

To enable the polymer melt and the supercritical fluid to mix uniformly in the mixing cartridge space (311), the mixing rotor (34) further includes a column-like body (341) in the shape of a straight cylinder, rotatably disposed in the mixing cartridge (31). A first groove portion (342) is annularly arranged on the periphery of the column-like body (341) at one end adjacent to the second feeding passage (32) and the gas transfer passages (41). A second groove portion (343) is annularly arranged on the periphery of the column-like body (341) at the other end adjacent to the second discharging passage (33). Therefore, when the column-like body (341) rotates, the polymer melt and the supercritical fluid are agitated by the first groove portion (342) and the second groove portion (343), so as to achieve a desired mixing effect.

Figure 6:
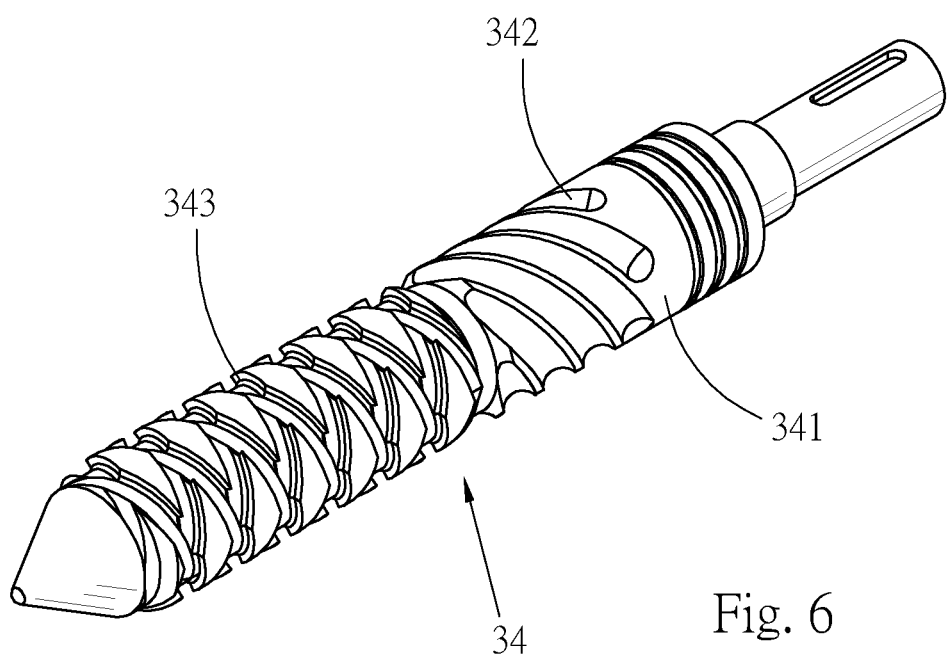
FIG. 6 is a perspective view of a mixing rotor of the embodiment of the present invention.

Further, the first groove portion (342) and the second groove portion (343) may have a plurality of grooves of different curvatures, respectively, as shown in FIG. 6, such that a better mixing effect of the polymer melt and the supercritical fluid is achieved in the mixing cartridge space (311).

Figure 7:
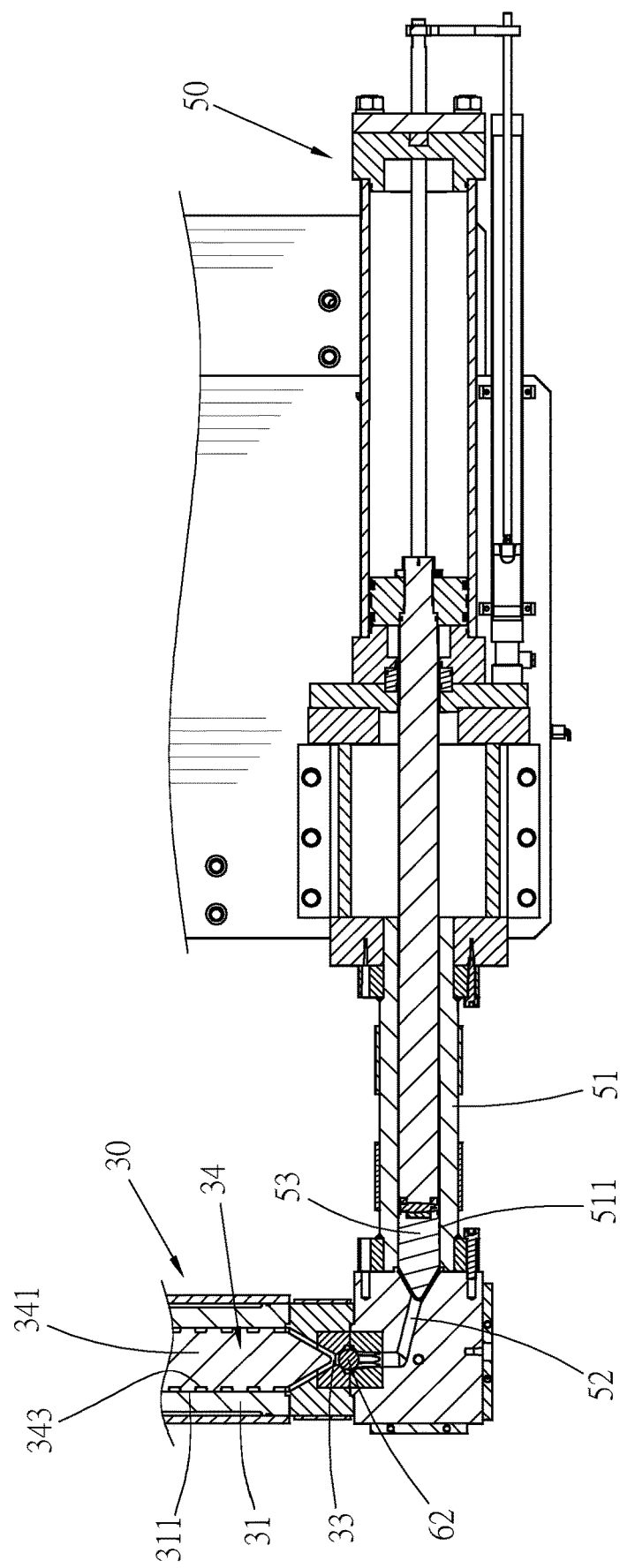
FIG. 7 is a cross-sectional view taken along the section line 7-7 in FIG. 1.

In addition, as shown in FIG. 7, the metering unit (50) is disposed outside the second discharging passage (33) of the mixing unit (30), and has a hollow metering cartridge (51) generally in the shape of a column, a connecting passage (52) for communication of the inner metering space (511) of the metering cartridge (51) and the second discharging passage (33), and a plunger-shaped discharging member (53) slidably disposed in the inner metering space (511) and reciprocatably displace along the cylindrical axis of the metering cartridge (51). Therefore, the single-phase solution obtained after mixing by the mixing unit (30) can enter the inner metering space (511) for measurement through the connecting passage.

It should be noted that, conventionally, the single-phase solution is fed into an inner chamber of a mold for molding, and although in the present embodiment, the single-phase solution is fed into the metering unit (50) for measurement and a predetermined amount of the single-phase solution is then filled into an external mold through a feeding passage communicating with the connecting passage (52), the present invention is not limited thereto. In industrial utilization, the metering unit can be omitted, and the single-phase solution obtained after mixing by the mixing unit (30) is directly fed into an external mold for molding. The feeding can be performed continuously or in batches or performed by means of injection or extrusion. These implementations are all based on the main technical features of the present invention, and all fall within the implementing aspects of the present invention.

In effect, by using the structure in which the mixing unit (30) is separated from the hot-melting unit (20), the rotation speed of the pushing member (24) and the rotation speed of the mixing rotor (34) do not interfere with each other, and may be appropriately selected according to different purposes of hot-melting and mixing, so as to achieve an optimal hot-melting effect and an optimal mixing effect. Compared with the structure in the prior art in which the mixing unit (30) and the hot-melting unit (20) are associated with each other, the technical content provided by the present invention has the advantage of more flexibility in industrial utilization.

In addition, for the purposes of hot-melting, pressing and pushing a solid polymer raw material, the pushing member (24) usually has a large groove depth to achieve the pressing and pushing effect on the polymer, and for homogeneous mixing between the polymer melt and the supercritical fluid, it is advantageous to enable the polymer melt and the supercritical fluid to sufficiently flow relative to each other. Therefore, the groove depth of the first groove portion (342) and the second groove portion (343) of the mixing rotor (34) is smaller than the groove depth of the pushing member (24), to realize dispersion and micromixing, thereby achieving a better mixing effect. However, the groove depths and shapes may vary according to raw materials and conditions, and shall not be used to limit the present invention.

Further, to avoid undesired backflows between the mixing unit (30) and the hot-melting unit (20), as shown in FIG. 3 to FIG. 5, a spherical first check valve (61) is disposed between the first discharging passage (23) and the second feeding passage (32), so as to stop the mixture in the mixing unit (30) from reversely flowing from the second feeding passage (32) to the first discharging passage (23).

Similarly, to avoid backflows between the mixing unit (30) and the metering unit (50), as shown in FIG. 4 and FIG. 7, a spherical second check valve (62) is disposed between the second discharging passage (33) and the connecting passage (52), so as to stop the mixture in the connecting passage (52) from reversely flowing to the second discharging passage (33). Therefore, when the metering unit (50) fills the measured mixture into an external mold through the connecting passage (52), the mixture can be prevented from reversely flowing to the mixing unit (30).

Moreover, to ascertain operating conditions such as pressure and temperature in the mixing unit (30), as shown in FIG. 5, the mixing unit (30) further has a pressure and/or temperature sensor (35) disposed in the mixing cartridge (31) and used to sense the pressure and/or temperature in the mixing cartridge inner space (311), for the purpose of control in industrial implementation.

Accordingly, the mechanism for mixing a supercritical fluid and a polymer raw material melt provided by the present invention achieves separation of the hot-melting and mixing processes in industrial utilization, resulting in convenience in use, and enables easy homogeneous mixing of a single-phase solution, providing a molded foam with a desired forming quality.

LIST OF REFERENCE NUMERALS

(10) mechanism for mixing a supercritical fluid and a polymer raw material melt, (20) hot-melting unit, (21) pressing cartridge, (211) pressing cartridge inner space, (22) first feeding passage, (23) first discharging passage, (24)

pushing member, (25) feeding hopper, (26) discharging end member, (30) mixing unit, (31) mixing cartridge, (311) mixing cartridge inner space, (32) second feeding passage, (33) second discharging passage, (34) mixing rotor, (341) column-like body, (342) first groove portion, (343) second groove portion, (35) sensor, (40) supercritical fluid supplying unit, (41) gas transfer passage, (50) metering unit, (51) metering cartridge, (511) inner metering space, (52) connecting passage, (61) first check valve, (62) second check valve

What is claimed is:

1. A mechanism for mixing a supercritical fluid and a polymer raw material melt, comprising:

a hot-melting unit, having a hollow pressing cartridge, wherein a first feeding passage and a first discharging passage are disposed at two ends of the pressing cartridge, respectively, and communicates with a hollow interior of the pressing cartridge and an external space of the pressing cartridge, respectively; a pushing member is disposed in the pressing cartridge between the first feeding passage and the first discharging passage, and is used to push, toward the first discharging passage, a polymer raw material entering the hollow interior of the pressing cartridge through the first feeding passage;

a mixing unit, having a hollow mixing cartridge, wherein a second feeding passage and a second discharging passage are disposed at two ends of the mixing cartridge, respectively, and the second feeding passage communicates with the first discharging passage, such that the polymer raw material pushed out of the first discharging passage enters a hollow interior of the mixing cartridge through the second feeding passage; a mixing rotor is disposed in the mixing cartridge between the second feeding passage and the second discharging passage, and is rotatable in the mixing cartridge, so as to agitate the polymer raw material accommodated in the mixing cartridge;

a supercritical fluid supplying unit, disposed on the mixing unit and spaced from the hot-melting unit, such that an external supercritical fluid is introduced into the hollow interior of the mixing cartridge, and together with the polymer raw material in the mixing cartridge, is agitated by the mixing rotor and mixed into a homogeneous single-phase solution;

a metering unit, receiving the single-phase solution discharged from the second discharging passage; and a spherical first check valve located between the first discharging passage and the second feeding passage to stop the mixture in the mixing unit from reversely flowing from the second feeding passage of the mixing unit to the first discharging passage of the hot melt unit, and a spherical second check valve located between the second discharging passage and a connecting passage of the metering unit to stop the mixture in the connecting passage from reversely flowing to the second discharging passage of the mixing unit;

wherein the supercritical fluid supplying unit has a gas transfer passage;

wherein the mixing rotor has a column-like body rotatably disposed in the mixing cartridge, a first groove portion annularly arranged on the periphery of the column-like body at one end thereof adjacent to the second feeding passage; and a second groove portion annularly arranged on the periphery of the column-like body at another end thereof;

wherein the first groove portion of the mixing rotor is located adjacent to the second feeding passage, spherical first check valve, and the gas transfer passage, and the second groove portion of the mixing rotor is located adjacent to the second discharging passage and the spherical second check valve;

wherein the first groove portion and the second groove portion are arc-shaped portions of different curvatures, the first groove portion has a pitch that is looser than a pitch of the second groove portion;

wherein the first groove portion is located in an upstream section of the mixing unit, the gas transfer passage and the second feeding passage are located upstream of the mixing unit and the external supercritical fluid and the polymer raw material are injected into the upstream section of the mixing unit at a same time.

2. The mechanism for mixing a supercritical fluid and a polymer raw material melt according to claim 1, wherein the gas transfer passage is disposed on the mixing cartridge and communicating with the hollow interior of the mixing cartridge, and used to form a flow passage through which the external supercritical fluid enters the mixing cartridge.

3. The mechanism for mixing a supercritical fluid and a polymer raw material melt according to claim 2, wherein the gas transfer passage is disposed adjacent to the second feeding passage.

4. The mechanism for mixing a supercritical fluid and a polymer raw material melt according to claim 1, wherein the first groove portion and the second groove portion are separated from each other.

5. The mechanism for mixing a supercritical fluid and a polymer raw material melt according to claim 1, wherein the pushing member is a screw, rotatably disposed in the pressing cartridge.

6. The mechanism for mixing a supercritical fluid and a polymer raw material melt according to claim 1, wherein the metering unit has a hollow metering cartridge, a hollow inner space thereof communicating with the second discharging passage and used to accommodate the single-phase solution; and a discharging member, slidably disposed in the hollow inner space of the metering cartridge, and used to discharge the single-phase solution accommodated in the metering cartridge out of the metering cartridge;

wherein the discharging member has a plunger shape.

\* \* \* \* \*